(12) United States Patent
Hodges et al.

(10) Patent No.: US 6,820,669 B2
(45) Date of Patent: Nov. 23, 2004

(54) WHEEL WITH EXTENDED OUTER FLANGE

(75) Inventors: Frank J. Hodges, Yorba Linda, CA (US); Sergiu Anca, Garden Grove, CA (US)

(73) Assignee: Tezzen Wheel Corporation, Corona, CA (US)

( * ) Notice: Subject to any disclaimer, the term of this patent is extended or adjusted under 35 U.S.C. 154(b) by 0 days.

(21) Appl. No.: 10/266,040

(22) Filed: Oct. 7, 2002

(65) Prior Publication Data

US 2004/0066087 A1 Apr. 8, 2004

(51) Int. Cl.$^7$ ................................................. B60C 19/00
(52) U.S. Cl. ........................................ 152/455; 301/5.21
(58) Field of Search .......................... 301/5.21, 95.109, 301/95.11, 95.101, 95.105, 95.108, 63.1; 152/455, 456, 379.3, 379.4, 379.5, 380, 381.3, 378 W, 378 R, 396

(56) References Cited

U.S. PATENT DOCUMENTS

| | | | |
|---|---|---|---|
| 1,757,275 A | 5/1930 | Van Halteren | |
| 1,936,877 A | 11/1933 | LaBrie | |
| 2,028,702 A | 1/1936 | Hale | |
| 2,108,329 A | 2/1938 | Carter | |
| 2,115,092 A | 4/1938 | Weinberg | |
| 2,203,774 A | 6/1940 | Cornelissen | |
| 2,209,967 A | * 8/1940 | Golod | 301/40.3 |
| 2,214,023 A | 9/1940 | Kaura | |
| 2,347,622 A | 4/1944 | Tschanz | |
| 2,440,804 A | 5/1948 | Lyon | |
| 2,488,864 A | 11/1949 | Handy | |
| 2,553,891 A | 5/1951 | Brosick | |
| 2,621,979 A | 12/1952 | Barnes | |
| 2,682,431 A | 6/1954 | Dovberg | |
| 2,854,052 A | 9/1958 | Smith et al. | |
| 3,208,798 A | 9/1965 | Peters | |
| 3,381,353 A | 5/1968 | Lemmerz | |
| 3,842,882 A | 10/1974 | Gough et al. | |
| 3,857,429 A | 12/1974 | Edwards | |
| 3,865,170 A | 2/1975 | Mitchell | |
| 3,974,870 A | 8/1976 | Watts | |
| 3,999,588 A | 12/1976 | Mitchell | |
| 4,124,679 A | 11/1978 | DeWitt | |
| 4,153,302 A | 5/1979 | Bass et al. | |
| 4,316,637 A | * 2/1982 | Reynolds et al. | 301/37.101 |

(List continued on next page.)

FOREIGN PATENT DOCUMENTS

| | | |
|---|---|---|
| EP | 0 587 053 A | 3/1994 |
| EP | 0587053 B1 * | 12/1996 |
| JP | 07 232507 A | 9/1995 |
| WO | WO 01/08905 | 2/2001 |

OTHER PUBLICATIONS

Partial International Search Report.

Primary Examiner—S. Joseph Morano
Assistant Examiner—Frantz F. Jules
(74) Attorney, Agent, or Firm—Knobbe Martens Olson & Bear LLP

(57) ABSTRACT

Disclosed are an improved wheel and tire for simulating the appearance of a larger-diameter wheel mounted within a low-profile tire. The wheel has an inboard side and an outboard side with a wide outer flange extending around the outer circumference of the wheel. The outer flange is preferably integral with the outboard face of the wheel. A design, preferably comprised of a plurality of protrusions, indentations, and slits, extends across at least a portion of the outboard face of the wheel, including the outboard face of the extended outer flange. In the improved tire, the outboard tire wall preferably includes a laterally extending wheel protector, a ledge, and a flange seat. The flange seat is preferably contoured to match the inner face of the outer flange of the improved wheel.

21 Claims, 13 Drawing Sheets

U.S. PATENT DOCUMENTS

| | | |
|---|---|---|
| 4,365,659 A | 12/1982 | Yoshida et al. |
| 4,466,670 A | 8/1984 | Kaji |
| 4,486,259 A | 12/1984 | Irie |
| 4,533,183 A | 8/1985 | Gant |
| 4,674,549 A | 6/1987 | Bush |
| 4,709,738 A | 12/1987 | Goodell et al. |
| 4,747,440 A | 5/1988 | Holmes et al. |
| 4,770,220 A | 9/1988 | Mori |
| 4,797,987 A | 1/1989 | Bush |
| 4,997,235 A | 3/1991 | Braunngart |
| 5,000,241 A | 3/1991 | Patecell |
| 5,018,566 A | 5/1991 | Thoni |
| 5,092,661 A | 3/1992 | Meyers |
| 5,273,599 A | 12/1993 | Adachi |
| 5,301,728 A | 4/1994 | Brown, Jr. et al. |
| 5,350,220 A * | 9/1994 | Atwell, Jr. ............... 301/5.21 |
| 5,354,405 A | 10/1994 | Byerley |
| 5,429,422 A * | 7/1995 | Baldi ........................ 301/65 |
| 5,435,629 A | 7/1995 | Suzuki |
| 5,505,803 A | 4/1996 | Byerley |
| 5,531,508 A | 7/1996 | Bell, III |
| 5,533,793 A | 7/1996 | Walker |
| 5,591,282 A * | 1/1997 | Weber et al. ............... 152/456 |
| 5,620,235 A | 4/1997 | Janus |
| 6,024,415 A | 2/2000 | Stach |
| 6,109,701 A * | 8/2000 | Budnik .................. 301/64.102 |
| 6,254,194 B1 | 7/2001 | Capouellez et al. |
| 6,257,675 B1 | 7/2001 | Leynaert |
| 6,315,366 B1 | 11/2001 | Post et al. |
| 6,318,428 B1 | 11/2001 | Lo |
| 6,325,462 B1 | 12/2001 | Hummel et al. |
| 6,457,501 B1 | 10/2002 | Ball |
| 6,527,346 B2 | 3/2003 | Chen |
| 6,547,341 B1 | 4/2003 | Griffin |
| 2002/0079735 A1 | 6/2002 | Hazelwood et al. |

* cited by examiner

WHEEL WITH EXTENDED OUTER FLANGE

BACKGROUND OF THE INVENTION

1. Field of the Invention

This invention relates generally to tires and wheels for vehicles and in particular to tires and wheels for creating the appearance of low-profile tires mounted on large-diameter wheels.

2. Description of the Related Art

In recent years, consumer demand for large-diameter vehicle wheels mounted within low-profile tires has increased dramatically. Such wheels and tires create a stylish look for the vehicle on which they are used, but they cost much more than standard-sized wheels and tires. As a consequence, large-diameter wheels and low profile tires are desired by many consumers, but are beyond the financial reach of a large segment of the market. Moreover, most companies that make wheels are set up for mass production of wheels of certain standard sizes, and have often lagged behind consumer demand in developing or re-tooling expensive equipment, including molds and casting machinery, to produce the largest wheels desired by consumers.

Some consumers who want, but cannot afford or obtain, wheels with a sufficiently large diameter mounted within low profile tires may be willing to pay an intermediate cost to make standard-sized wheels and tires take on the appearance of the more expensive (and possibly unavailable) products. Detachable wheel extensions, such as the one shown in U.S. Patent Publication No. U.S. 2002/0079735 A1, have been used to attempt to simulate the appearance of larger wheels mounted within low-profile tires. However, such extensions mask a portion of the front face of the wheel and do not provide a surface integral with the design on the face of the wheel. Thus, the attempted simulation does not have a realistic-looking appearance.

In particular, the wheel extensions of the prior art have an inner ring that is removably secured within an inside edge of the outer lip of the existing wheel using a compression fit (as with a standard hub cap). A wide outer flange is attached to the inner ring and extends radially outwardly across a portion of the outside tire wall. The wheel extensions are intended to be used with many different types of wheels having a variety of surface designs on their front faces. The outward surfaces of the inner ring and outer flange generally have a smooth, generic appearance to attempt to aesthetically interface with all of these different designs. Although outer flanges of the prior art may include a narrow, upturned lip formed along the outer diameter of the flange and/or an undulated outward surface (e.g., a smooth stair-step pattern of concentric rings), the flanges do not include protrusions, indentations, or slits on their surfaces as are commonly found on the central portion of the front face of many wheels.

The inner ring for securing the wheel extension to the wheel is generally at least about ½ inch thick around its circumference, which covers up a significant portion of the underlying wheel face. When mounted on a wheel with a 17-inch diameter, a ½-inch thick ring makes the wheel appear to be only 16-inches in diameter. This results in a reduction of the visible surface area of the wheel by well over 10 percent. In addition, the smooth outward surfaces of the inner ring and outer flange generally do not blend in well with the existing design of the wheel. Indeed, the wheel extensions of the prior art are usually easily detectable by even a casual observer, and merely give the appearance of an over-extended add-on lip covering a portion of the outer tire wall. Thus, the attempted simulation is not only ineffective, it actually creates the opposite effect. Rather than simulating a larger wheel mounted within a low profile tire, the wheel extension gives the appearance of a smaller wheel mounted on a standard tire.

Moreover, the detachability of the wheel extension gives rise to additional problems. For example, wheel extensions are generally secured to wheels by providing compressible tabs which must be pressed with a tamping force within the outer lip of a standard wheel. The tabs sometimes bend or break during installation or when the wheel strikes another object, such as a sidewalk curb, causing the wheel extension to wobble or to fall off completely when the wheel turns.

SUMMARY OF THE INVENTION

The present invention provides an improved wheel and tire for simulating the appearance of a larger-diameter wheel mounted within a low-profile tire. The wheel has an inboard side and an outboard side. The outboard side includes a wide outer flange which extends around the outer circumference of the wheel. The outer flange is preferably integral with the outboard face of the wheel and covers a substantial portion of the outboard wall of the tire within which the wheel is mounted. A design, preferably comprised of, for example, a plurality of protrusions, indentations, and slits, extends across at least a portion of the outboard face of the wheel, including the outboard face of the extended outer flange.

The improved tire of the present invention is intended to be mounted on the improved wheel of the present invention with an extended outer flange. The tire comprises an outboard tire wall, an inboard tire wall, and a tread therebetween. The outboard tire wall preferably includes a laterally extending wheel protector, a ledge, and a flange seat. The flange seat is preferably contoured to match the inner face of the outer flange of the wheel and is preferably more rigid than the remainder of the tire to prevent the tire from deflecting into the outer flange of the wheel under the load of a vehicle.

The wheel of the present invention may be mounted within a standard tire of the prior art or may be mounted within the tire of the present invention to produce a highly effective simulation of a larger-diameter wheel mounted with a low-profile tire.

BRIEF DESCRIPTION OF THE DRAWINGS

In FIGS. 2, 5, 7, 9, and 11, a portion of the wheels is shown cut away to illustrate the interior space.

DETAILED DESCRIPTION OF THE PREFERRED EMBODIMENT

Figure 1:
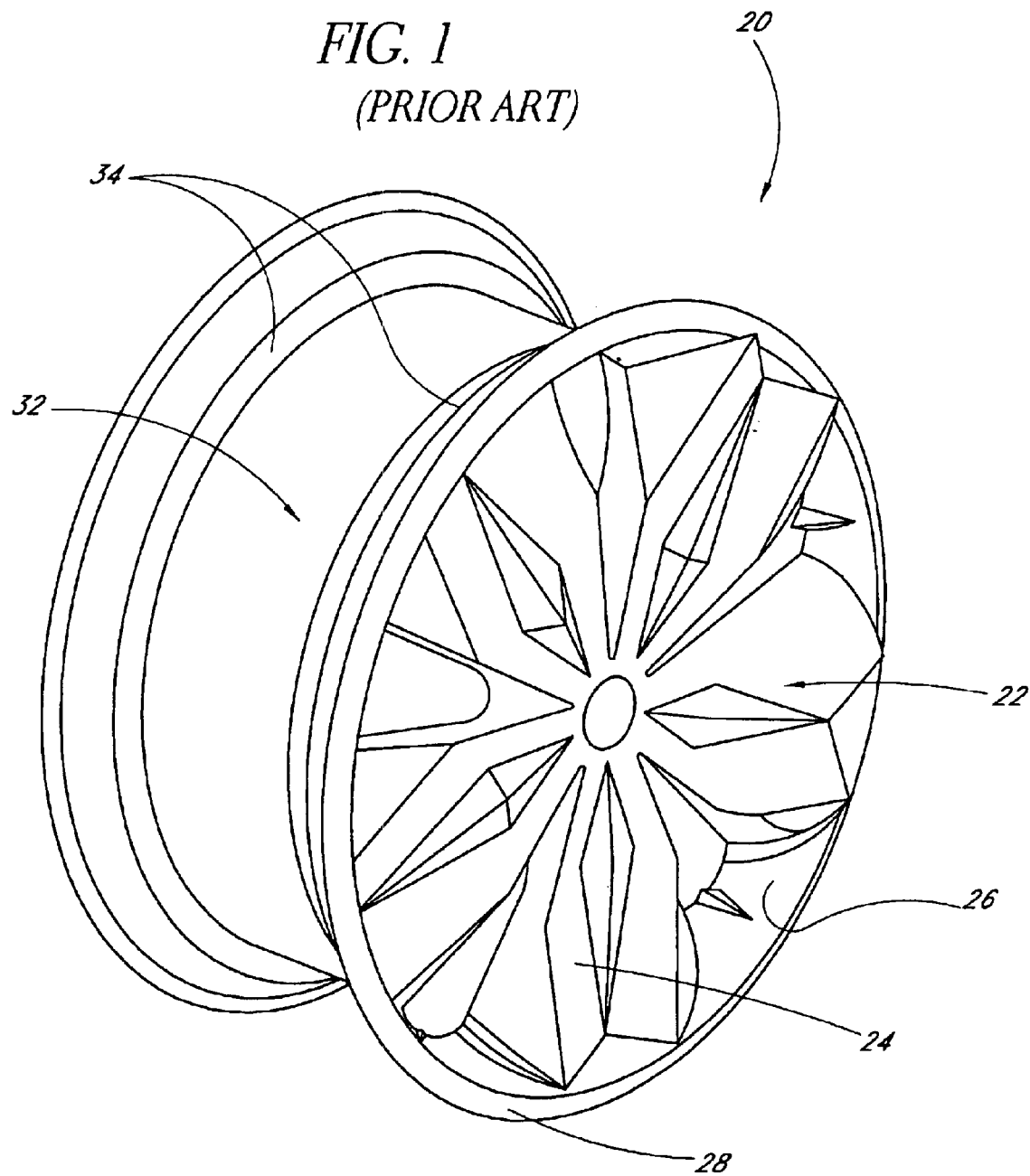
FIG. 1 is an outboard perspective view of a wheel as in the prior art.

When mounted on a vehicle, a wheel has an "inboard" side that faces the interior of the vehicle and an "outboard" side that faces away from the vehicle. FIG. 1 shows an outboard perspective view of a wheel 20 as in the prior art. The wheel 20 has a central hub 22 with an outboard face 24. The wheel 20 also has a sidewall 26 that extends horizontally away (i.e., in the outboard direction) from the central hub 22, and an outboard lip 28 that extends radially outwardly from the outer edge of the sidewall 26. As used herein, the term "radially outwardly" refers to substantially circular or cylindrical surfaces that extend from an inner point, line, or circle to an outer circle.

Figure 2:
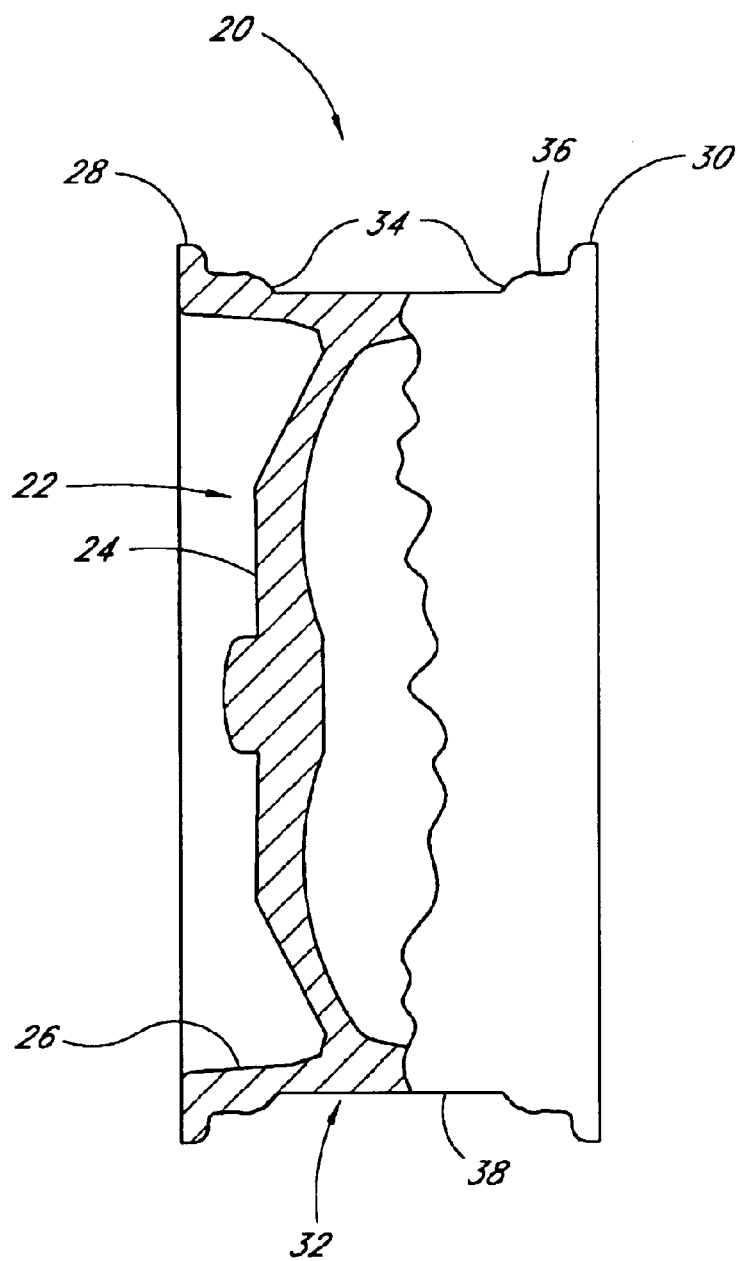
FIG. 2 is a side view of the wheel of FIG. 1.

Referring to FIG. 2, on the inboard side of the wheel 20 is an inboard lip 30 that is similar in shape and size to the outboard lip 28. In a typical wheel of the prior art, each lip 28, 30 is about ¾ inch long from the base of the lip to the peak of the lip, and about ¼ inch in thickness from the outboard side of the lip to the inboard side of the lip.

The portion of the wheel 20 extending between the inboard lip 30 and the outboard lip 28 is known as the wheel barrel 32. The barrel 32 is substantially cylindrical in shape and its central axis lies on the center of the face 24 of the wheel 20. In a typical 17-inch wheel, the distance along the wall 38 of the barrel 32 between the inboard lip 30 and the outboard lip 28 is about 8 inches. The barrel 32 must be sufficiently rigid to resist the substantial forces that act upon the wheel 20, especially during extreme acceleration, braking, and turning. As a result, the majority of the mass of the wheel 20 is generally located in the barrel 32, and the majority of the cost of the alloy metal used to make the wheel is spent on the material for the barrel 32.

There is a significant difference in barrel 32 masses among wheels of different sizes. An approximation for the volume of the alloy metal required to make the barrel 32 is calculated as follows:

$$0.25\ \pi t(d_{out}^2 - d_{in}^2)$$

where t is the barrel depth or distance between the inboard and outboard lips 30, 28; $d_{in}$ is the inner diameter of the barrel 32; and $d_{out}$ is the outer diameter of the barrel 32. The foregoing formula approximates the volume of the barrel 32 by presuming that the wall of the barrel 32 has a uniform diameter across its entire surface, even though it varies somewhat (due primarily to the sloping portions 34), but the calculation is sufficiently close for purposes of this description.

The thickness of the wall of the barrel 32 is typically about 5/16 inch. As an example, a 17-inch wheel has an inner barrel diameter ($d_{in}$) of about 17 inches, an outer barrel diameter ($d_{out}$) of about 17 5/16 inches (i.e., the inner diameter plus the wall thickness), and a barrel depth (t) of about 8 inches. Using the foregoing equation, the resulting volume of the alloy metal for a 17-inch wheel is calculated to be about 69 cubic inches. In contrast, a 22-inch wheel has an inner barrel diameter of about 22 inches, an outer barrel diameter of about 22 5/16 inches, and a barrel depth of about 10 inches. The resulting volume of the alloy metal is therefore about 110 cubic inches. Thus, a 22-inch wheel requires nearly 60% more alloy metal for the wall of the wheel barrel 32 than a 17-inch wheel, even though the inner barrel diameter is only about 20% larger in a 22-inch wheel than a 17-inch wheel. This difference in material requirements is the primary reason why large-diameter wheels are much more expensive to manufacture than standard-sized wheels.

Figure 3:
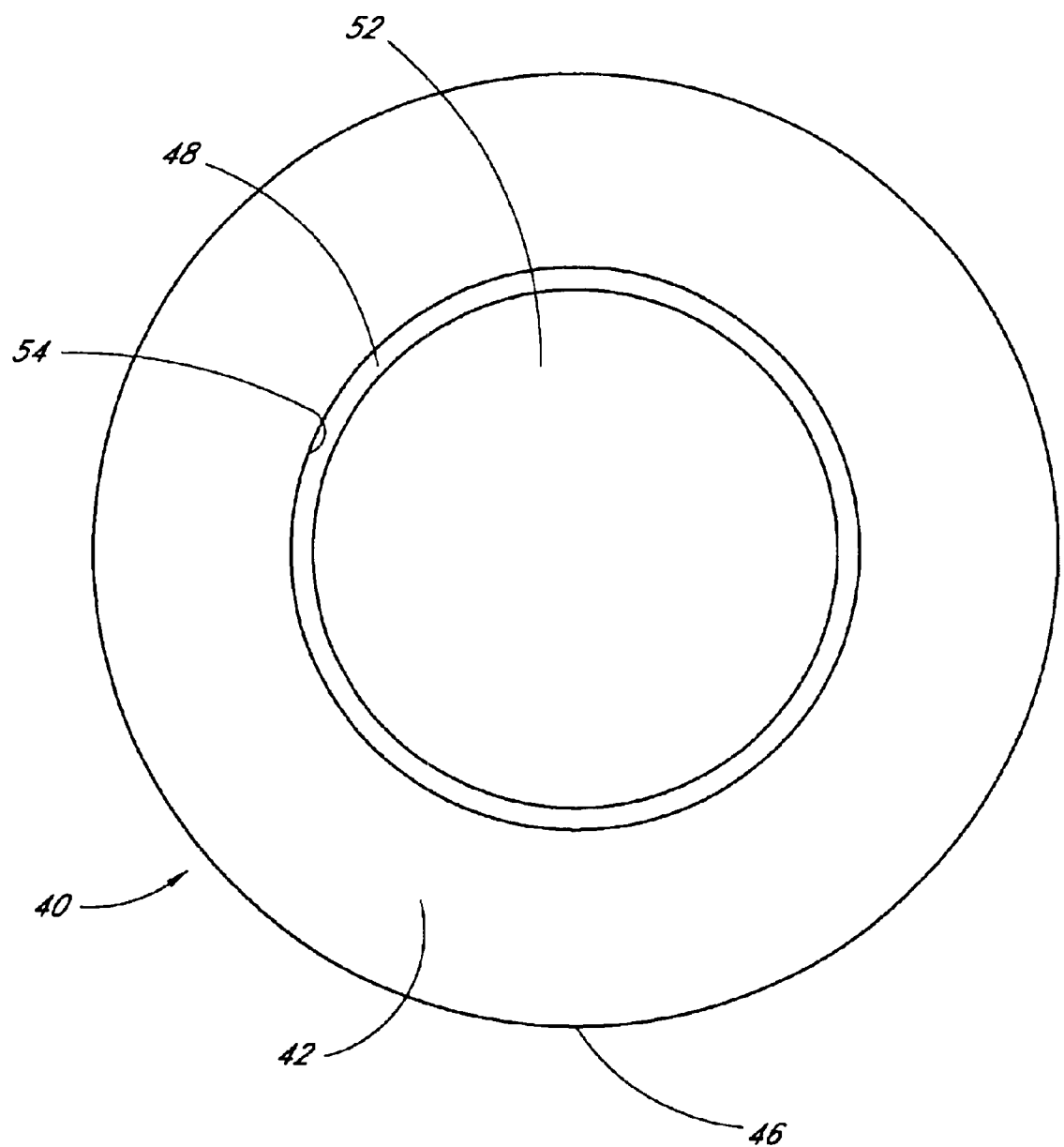
FIG. 3 is an outboard front view of a tire to be mounted on the wheel of FIG. 1 as in the prior art.
Figure 4:
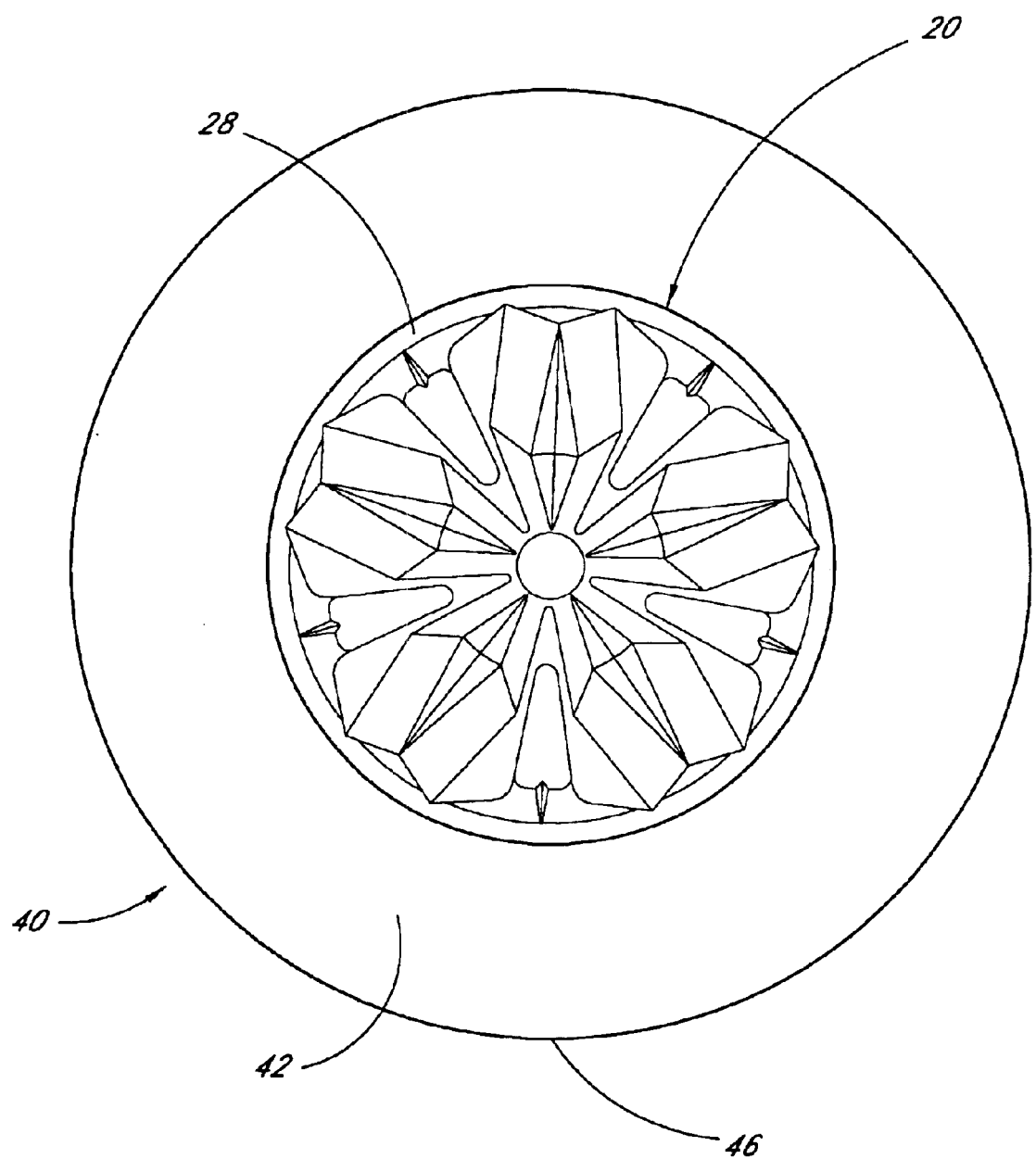
FIG. 4 is an outboard front view of the wheel of FIG. 1 with the tire of FIG. 3 mounted thereon.
Figure 5:
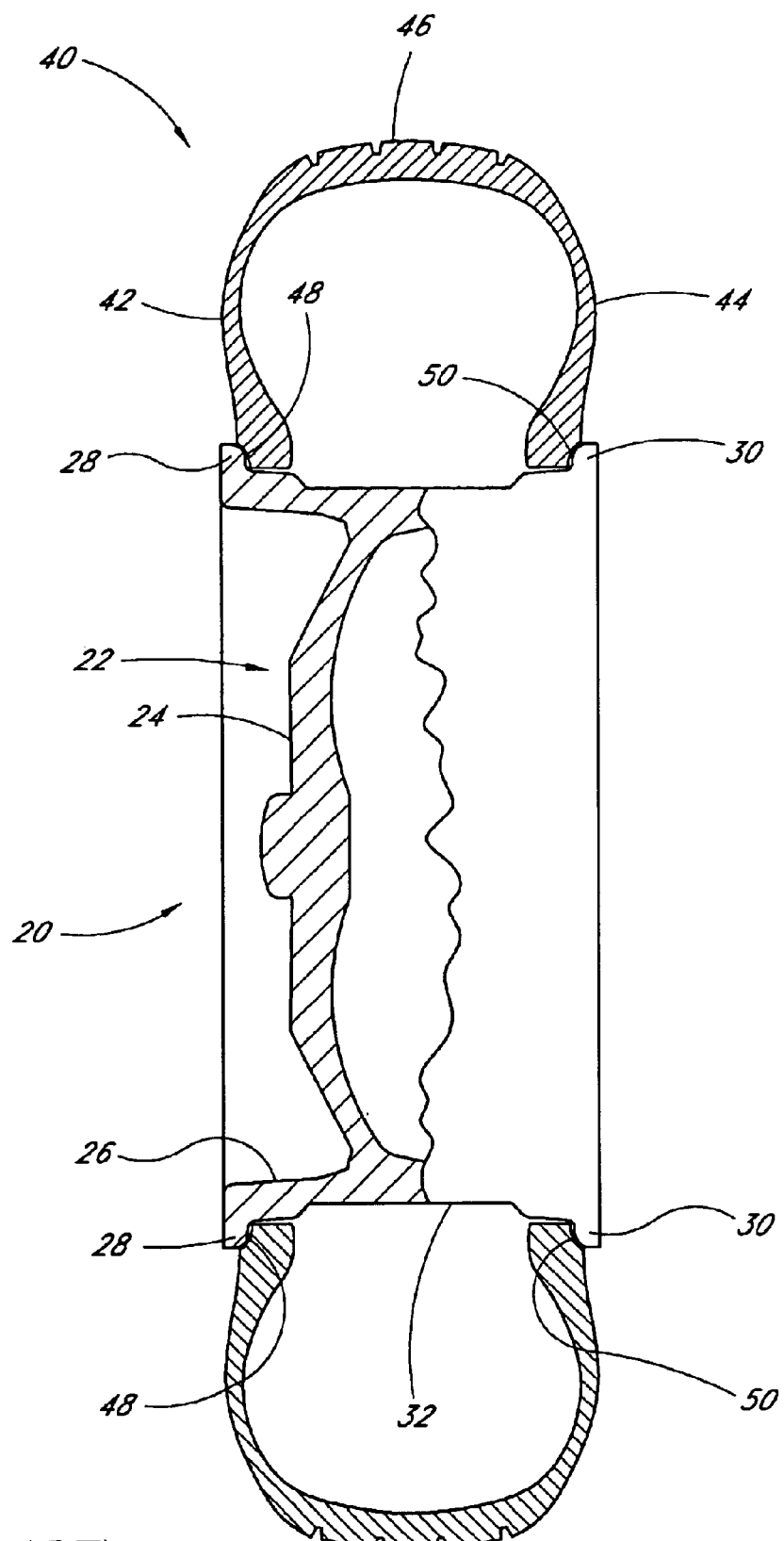
FIG. 5 is a side view of the wheel and tire of FIG. 4.

Referring to FIGS. 3–5, the tire 40 includes an outboard tire wall 42, an inboard tire wall 44, a tread 46, an outboard bead 48, an inboard bead 50, and a wheel void 52. The tire beads 48, 50 are essentially indented rings formed on the inner radial edges of the respective inboard and outboard tire walls 42, 44. The wheel 20 is mounted within the wheel void 52 of the tire 40.

During the tire mounting process, the outboard bead 48 of the tire 40 is forced behind the outboard lip 28 of the wheel 20, and the inboard bead 50 is forced behind the inboard lip 30. The width of the beads 48, 50 is intended to generally correspond to the height of the lips 28, 30. When a mounted tire is filled with air, the interior air pressure forces the beads 48, 50 firmly against the interior sides of the lips 28, 30, forming an air-tight seal. Because the lips 28, 30 and beads 48, 50 have generally corresponding sizes, the tire walls 42, 44 usually do not, under normal conditions and stationary loads, need to contort or stretch to pass around the lips 28, 30.

Figure 6:
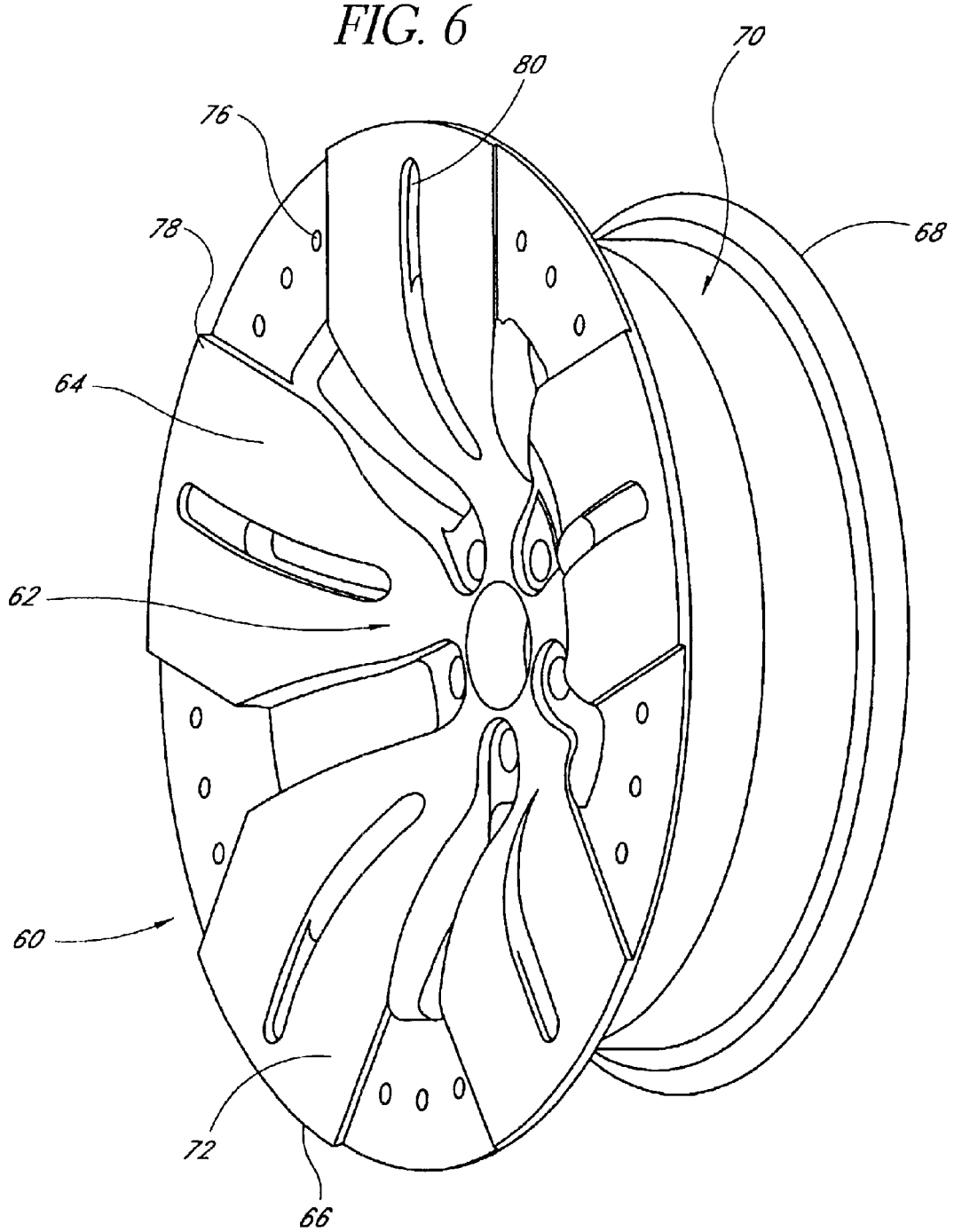
FIG. 6 is an outboard perspective view of an embodiment of a wheel of the present invention.

FIG. 6 is an outboard perspective view of an embodiment of a wheel 60 of the present invention. The wheel 60 has an outboard face 64 and an inboard face (not shown). The outboard face 64 is comprised of two concentric regions: a central hub 62 and an extended outer flange 66. As used herein, terms relating to circles and cylinders, such as "circular," "cylindrical," "diameter," "radius," and "concentric," are not intended to be limited to perfectly round structures. Rather, generally circular shapes, including those with large radial protrusions or indentations are encompassed by these terms.

The central hub 62 and the outer flange 66 are preferably integral with each other. The structural integrity ensures that the component parts will not become damaged and separated, and it generally provides a greater degree of continuity in appearance between the structures. The central hub 62 and the outer flange 66 are still considered to be integral with each other if additional structures (such as, for example, a lug nut cover) are attached to all or a portion of the central hub 62.

The region between the outboard face 64 and the inboard face is the wheel barrel 70. The wheel barrel 70 is approximately cylindrical in shape and its central axis lies approximately on the center of the face 64 of the wheel 60. An inboard lip 68 extends radially outwardly along the outer edge of the inboard face.

The central hub 62 extends radially from the center of the outboard face 64 to approximately the same outer diameter as the wheel barrel 70 (which is attached to the inboard side of the outboard face 64). The outer flange 66, in turn, extends from the outer diameter of the central hub 62 to the full outer diameter of the wheel face 64. The outer flange 66 has an outboard face 72 and an inboard face 74 (see FIG. 7). In the embodiment shown in FIG. 6, the boundary between the central hub 62 and outer flange 66 is essentially seamless. The seamless boundary is preferred because it enhances the desired simulation of a larger-diameter wheel. However, wheels with readily discernible boundaries between the central hub 62 and outer flange 66 may still provide the desired appearance and are encompassed by the present invention.

In the illustrated example, the diameter of the central hub 62 is approximately 17 inches, and the radial width across the flange face 72 is approximately 2½ inches. Thus, the diameter of the outboard face 64 of the wheel 60 is approximately 22 inches. Numerous other possible size combinations will be apparent to those of skill in the art after reading this disclosure. For example, central hubs 62 having diameters between 17 inches and 22 inches could be combined with outer flanges 66 with widths of 1 inch, 1½ inch, 2 inches, or 2½ inches, to produce overall wheel faces 64 of between 18 inches and 27 inches. Many other sizes within and beyond these ranges and examples are encompassed by the present invention.

As shown in FIG. 6, the wheel 60 includes an integral aesthetic design on its outboard face 62. The design preferably extends from the central hub 62 into and across at least a portion of the outer flange 66. The design on the outer flange 72 preferably includes a pattern of surface variations comprising a plurality of at least one of either indentations 76, protrusions 78, or slits 80 that are aesthetically consistent with and blend into the design of the central hub 62. As used herein, the term "slits" encompasses grooves formed on a surface whether or not such grooves pass through the surface. In the illustrated embodiment, the integral design creates the appearance that the spokes formed on the central hub 62 extend into the outer flange 66, making it more difficult to perceive upon casual inspection where the central hub 62 ends and the outer flange 66 begins. Indeed, the consistency and blending of the designs on the central hub 62 and outer flange 66 make it unlikely that the casual observer of a mounted wheel 60 would notice that the outer flange 66 extends beyond the wheel barrel 70.

In the illustrated example, the outer flange 66 has an upper portion 67 and a lower portion 69. The thickness of the upper portion 67 of the outer flange 66 is about ¼ inch, although the indentations and protrusions on the outboard surface of the outer flange 66 may produce variations in the thickness of the outer flange 66 in certain regions across its face. The thickness of the upper portion 67 of the outer flange 66 is preferably between about ⅛ inch to ¼ inch, and the outboard and inboard surfaces of the upper portion 67 are preferably generally parallel. In the illustrated embodiment, the lower portion 69 of the outer flange 66 is thicker than the upper portion 67. The inboard face of the lower portion 69 preferably has a curved upper edge and a straight lower edge. In the example shown, the thickness of the lower portion 69 ranges from about ¼ inch along its upper edge to about ½ inch along its lower edge. The thickness of the outer flange 66 for a given wheel is determined by a variety of factors relating to aesthetics and structural integrity. Many other possible shapes and thicknesses for the outer flange 66 will be apparent to those of skill in the art after reading this disclosure and are encompassed by the present invention.

Figure 7:
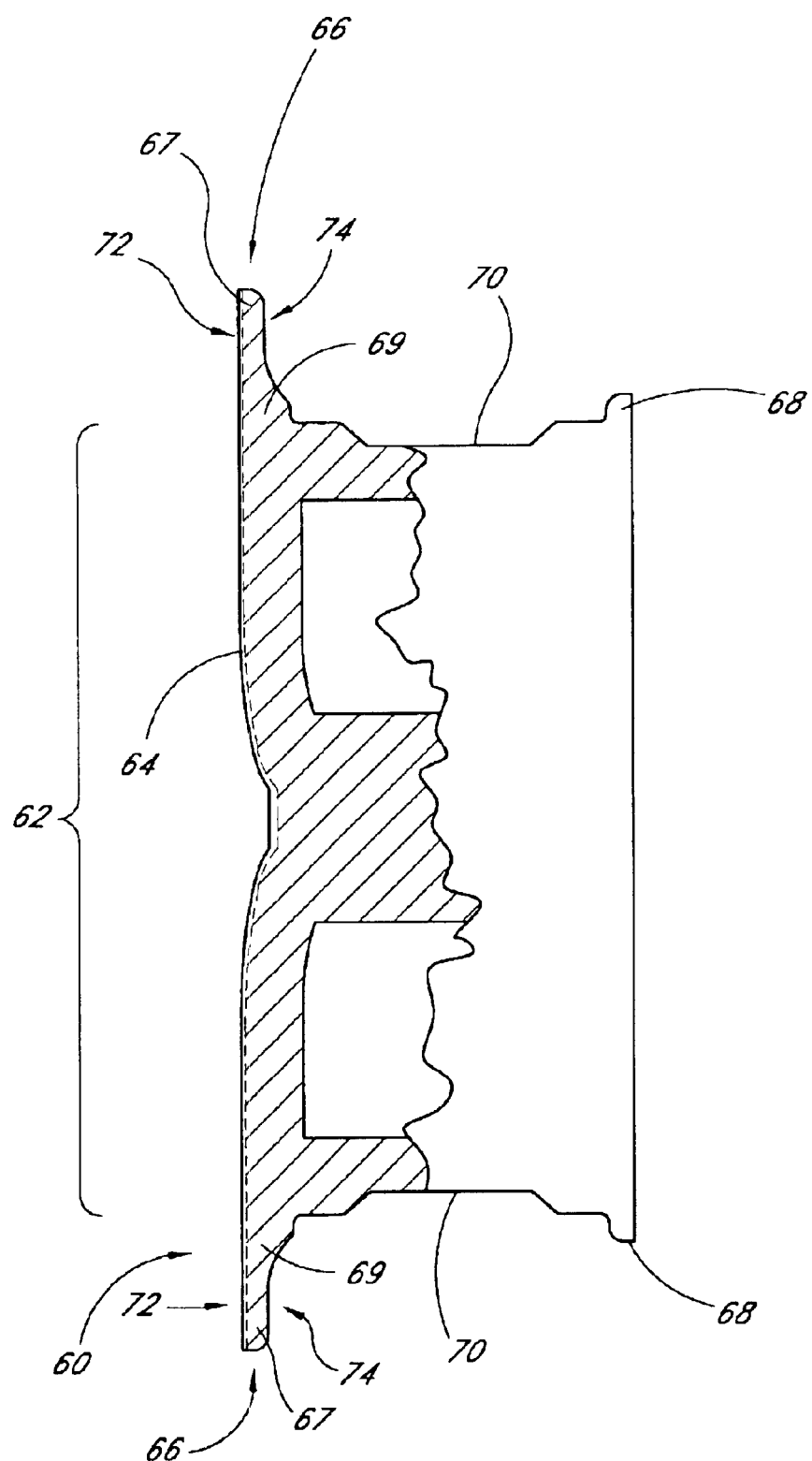
FIG. 7 is a side view of the wheel of FIG. 6.

As shown in FIG. 7, the radial extension of the inboard lip 68 is preferably less than the radial extension of the outer flange 66. In the illustrated embodiment, the height of the inboard lip 68 is about ¾ inch long from its peak to its base (at the outer radius on the inboard side of the wheel barrel 70), and about ¼ inch in thickness from its outboard side to its inboard side. Thus, the inboard lip 68 is preferably comparable in size to the inboard and outboard lips 30, 28 of typical prior art wheels. The height of the inboard lip is preferably between about ½ inch and ¾ inch. The inboard lip 68 is preferably smaller than the outer flange 66 to facilitate mounting a tire on the wheel 60 by permitting the leading edge of the tire to be slid over the smaller inboard side of the wheel 60 and then merely abutted against the interior side of the extended flange 66. It would be more difficult to slide the leading edge of the tire over the extended outer flange 66 on the outboard side of the wheel 60. Moreover, the smaller inboard lip 68 requires less alloy metal material than would an inboard lip comparable in size to the outer flange 66. The inboard lip 68 may also be comparable in size and/or shape with the outer flange 66 so as to produce a more balanced wheel 60.

The wheel 60 may be mounted within a typical prior art tire such as the tire 40 illustrated in FIG. 3. During the tire mounting process, the outboard bead 48 of the tire 40 is positioned behind the outer flange 66, and the inboard bead 50 is positioned behind the inboard lip 68. When the mounted tire is filled with air, the interior air pressure forces the beads 48, 50 firmly against the interior sides of the outer flange 66 and the inboard lip 68.

Figure 8:
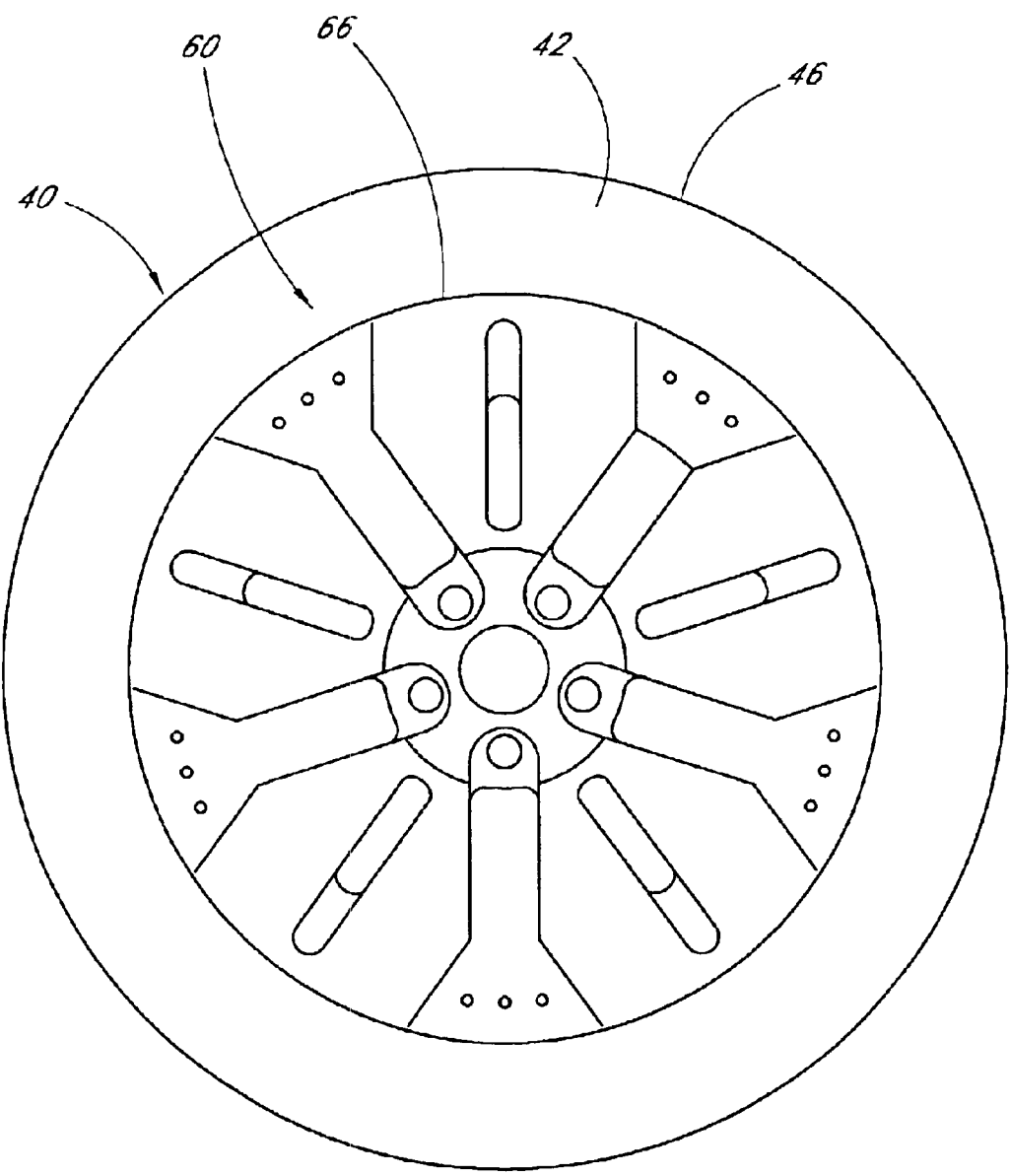
FIG. 8 is an outboard front view of the wheel of FIG. 6 with the tire of FIG. 3 mounted thereon.

FIG. 8 is an outboard front view of the wheel 60 with a typical prior art tire 40 mounted thereon. Although the diameters of the barrels 32, 70 of the wheels 20, 60 shown in FIGS. 4 and 8 are the same, and the tires 40 on which the wheels are mounted are the same, the mounted wheels 20, 60 have a remarkably different outward appearance. The wheel 60 of FIG. 8 gives the appearance of a significantly larger diameter wheel mounted on a low-profile tire. Upon casual inspection, it is unlikely that an observer would perceive that the barrel 70 of the wheel 60 actually has a much smaller diameter and that the outer flange 66 extends across a substantial portion of the outboard tire wall 42. Indeed, the diameter of the wheel 60 may even be made to appear to be larger than any wheel readily available to consumers in the mass-production wheel market.

Figure 9:
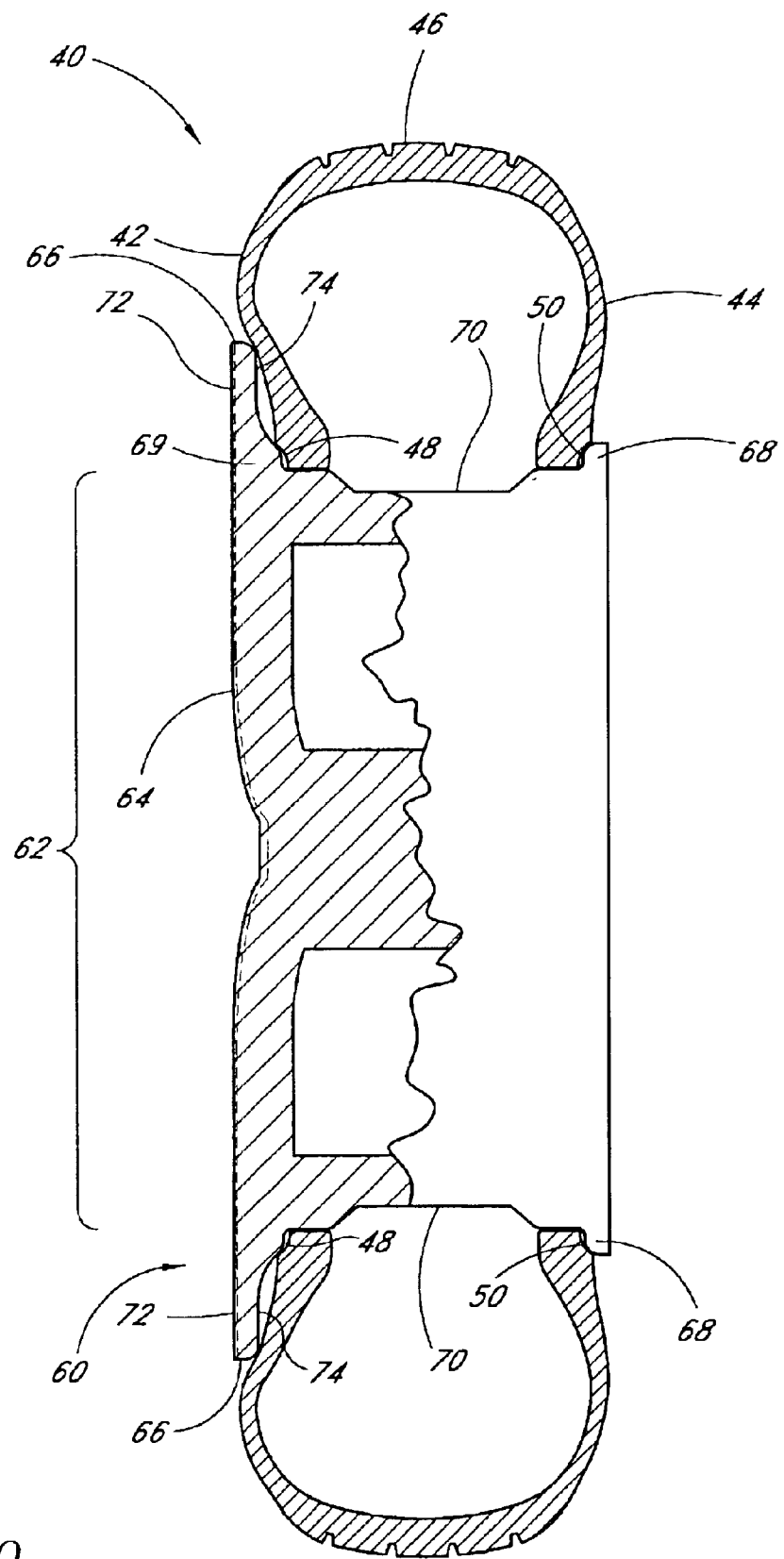
FIG. 9 is a side view of the wheel and tire of FIG. 8.

Referring to FIG. 9, the interface between the inboard lip 68 and the inboard tire wall 44 is similar to that of standard wheels and tires of the prior art. The inboard bead 50 is shaped to correspond to the size and shape of the inboard lip 68. The inboard tire wall 44 usually will not bend or contort to stretch around the inboard lip 68 under stationary loads and normal operating conditions.

The outboard bead 50 of the tire 40 interfaces with the lower portion 69 of the outer flange 66. The outboard tire wall 42 is pushed in the inboard direction by the outer flange 66, causing the tire wall 42 to bend inwardly around the outer flange 66. Thus, the tire 40, when mounted on the wheel 60 with the outer flange 66, has a somewhat concave radially inward outboard surface, whereas the tire 40, when mounted on the wheel 20 with a typical outboard lip 28, has a more convex radially inward outboard surface (see FIG. 5) when pressurized under a standard vehicle load.

The use of a standard tire 40 on the wheel 60 is feasible, but has potential disadvantages. First, as previously explained, the inner radial portion of the outboard tire wall 42 must usually bend around the outer flange 66, forming a concave radially inward outboard surface. The tire 40 is not specifically designed to be mounted on such a wheel 60 and may be subject to unintended contortion forces along the outboard tire wall 42, particularly near the radially outward edge of the outer flange 66, which could strain or cause excessive wear on the tire 40. Second, the outboard tire wall 42 often has words on its face, including the brand/model of the tire and the tire specifications (such as the tire volume and recommended tire pressure). The outer flange 66 may, depending upon its size and the relative positioning of the words, cover all or a portion of these words on the outboard tire wall 42. Third, the simulation of a larger-diameter wheel with a low-profile tire in a perspective view may be less effective when the wheel 60 does not appear to interface tightly with the tire 40 on which it is mounted.

Figure 10:
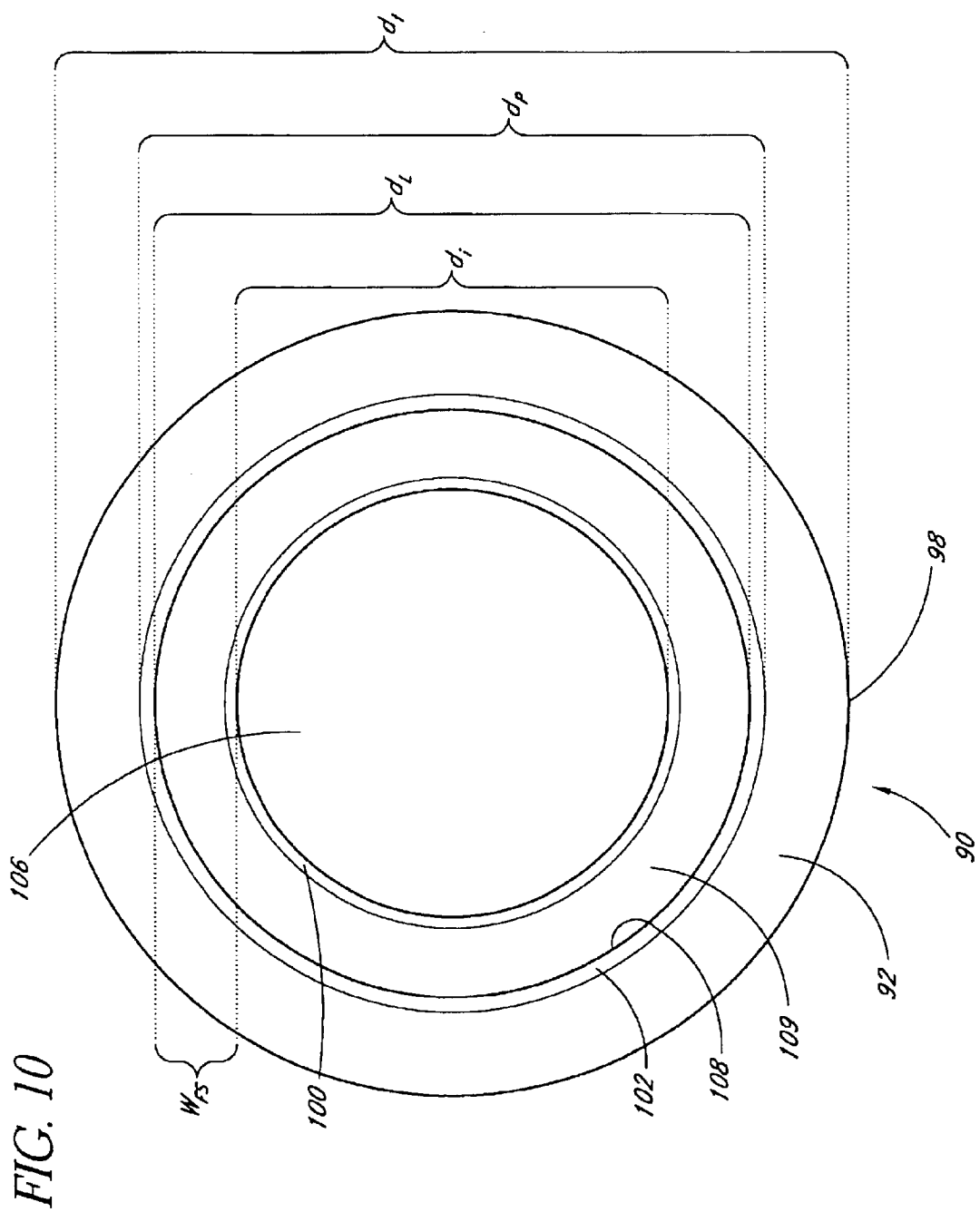
FIG. 10 is an outboard front view of an embodiment of a tire of the present invention.
Figure 11:
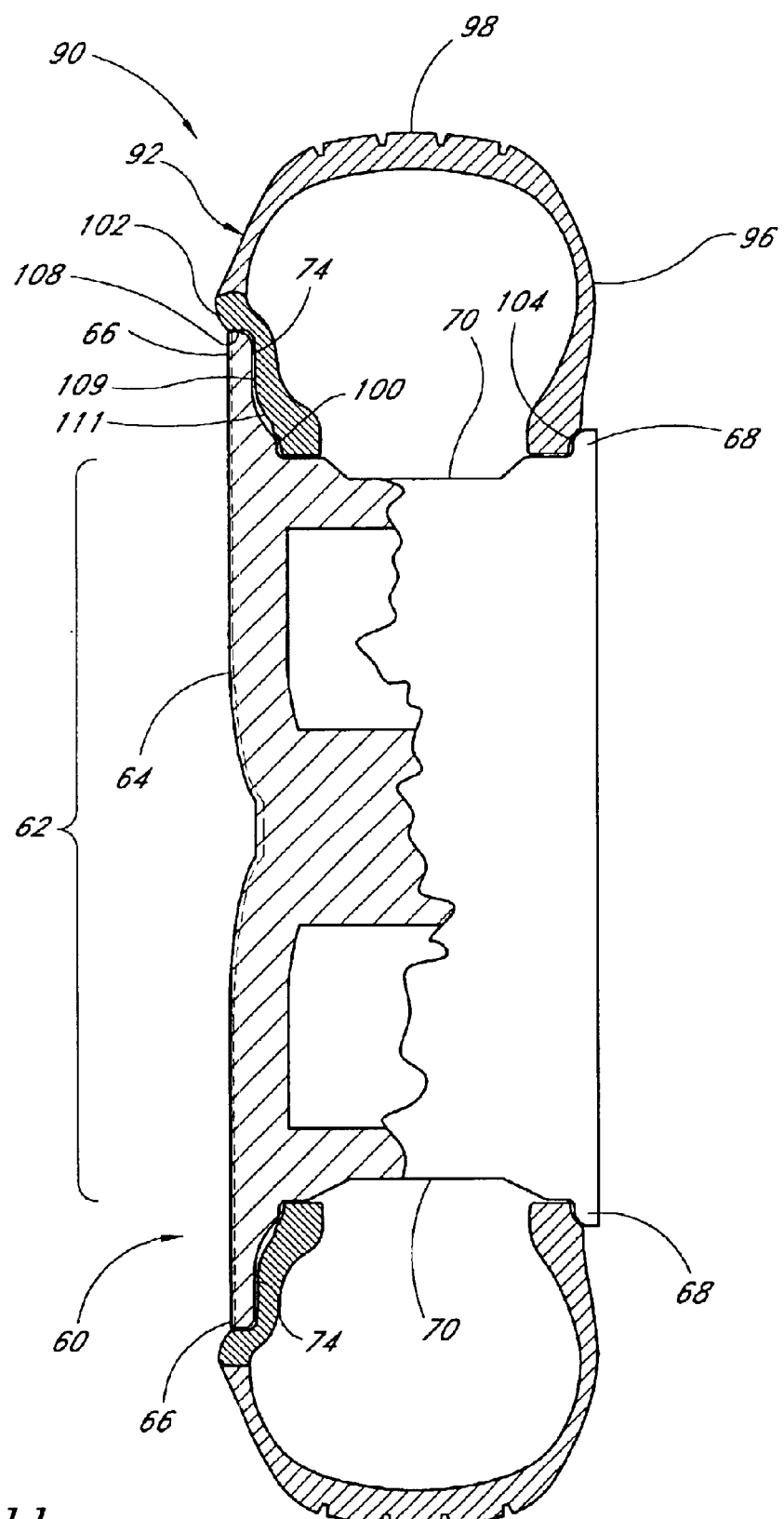
FIG. 11 is a side view of a wheel of the present invention with the tire of FIG. 10 mounted thereon.

Referring to FIGS. 10–11, an embodiment of the tire 90 of the present invention includes an outboard tire wall 92, an inboard tire wall 96, and a tread 98. The outboard tire wall 92 preferably includes an outboard bead 100, a wheel protector 102, and a ledge 108. As used herein, the term "ledge" may include horizontal, curved, slanted, or sloping surfaces. The inboard tire wall 96 preferably includes an inboard bead 104. The opening in the center of the tire 90 is the wheel void 106. The tire beads 100, 104 are comprised essentially of indented rings formed on the inner radial edges of the respective inboard and outboard tire walls 92, 96. The wheel 60 is mounted within the wheel void 106 of the tire 90.

The wheel protector 102 on the outboard tire wall 92 extends in the outboard direction beyond the outboard wheel face 64. Preferably, the wheel protector 102 extends at least about 1/16 inch, and more preferably between about 1/16 inch and about 1/4 inch beyond the wheel face 64. When the vehicle on which the tire 90 is mounted comes in contact with a large stationary object (such as a curb), the flexible wheel protector 102 on the outboard tire wall 92 touches the object instead of the wheel face 64. The wheel face 64 is thereby protected from scratching and bending. The width of the ledge 108 is preferably at least about 1/8 inch, and more preferably between about 1/8 inch and about 1/4 inch. Those of skill in the art will appreciate after reading this disclosure that many other widths for the ledge and wheel protector within and beyond these ranges are possible and are encompassed by the present invention.

In the illustrated embodiment, the outer radial location of the wheel protector 102 (i.e., the distance between the inner diameter $d_i$ of the tire and the diameter $d_p$ of the wheel protector 102 is about the same size or slightly larger than the 2½-inch-wide outer flange 66 of the wheel 60. As previously explained, those of skill in the art will appreciate after reading this disclosure that the outer flange 66 may have many other widths, including 1 inch, 1½ inches, 2 inches, or 2½ inches. Thus, the outer radial location of the wheel protector 102 would also have corresponding sizes of about 1 inch, 1½ inches, 2 inches, or 2-1/2 inches to approximately match the size of the outer flange 66. The region between the inner diameter $d_i$ of the tire wall 92 and the diameter $d_L$ of the ledge 108 is the flange seat 109. The width $W_{fs}$ of the flange seat 109 is preferably at least about one-quarter of the width of the outboard tire wall 92 (as measured along the tire wall 92 from the inner diameter $d_i$ to the outer tire diameter $d_t$ where the tread 98 begins). More preferably, the width $W_{fs}$ of the flange seat 108 is at least about one-third, and most preferably at least about one-half, of the width of the outboard tire wall 92. Many other sizes within and beyond these ranges and examples are encompassed by the present invention. If the flange seat 109 and outer flange 66 do not extend radially far enough, the desired simulation is less effective. If they extend too far, the vehicle to which the mounted wheel is attached would undesirably appear to be riding on its wheels with little or no tire visible.

As shown in FIG. 11, the inboard bead 104 is intended to correspond to the height of the inboard lip 68, and is similar in shape and size to the inboard bead 50 of a typical tire of the prior art (see FIG. 5). Any words written on the outboard tire wall 92 are preferably positioned above the flange seat 109 so that such words are fully visible after the wheel 60 has been mounted within the tire 90 and the outer flange 66 covers up substantially all of the flange seat 109.

The flange seat 109 is preferably contoured to generally match the inboard face 74 of the outboard flange 66. The flange seat 109 is also preferably constructed to be substantially more rigid than the remainder of the outboard tire wall 92, the tread 98, and/or the inboard tire wall 96. Those of skill in the art will appreciate after reading this disclosure that the rigidity of the flange seat 109 may be increased by any number of methods known in the art such as, for example, including or modifying the characteristics of imbedded radial belts, heating and/or compressing the rubber material, or otherwise changing the density or composition of the rubber material of the tire wall in this region. In this way, the flange seat 109 will preferably be prevented from pressing radially inwardly against the outer flange 66, which might otherwise bend the outer flange 66 and/or cause undue wear on the tire wall 92.

The flange seat 109 allows the outer flange 66 to be seated within the tire wall 92 in a manner that more closely simulates a large-diameter wheel mounted within a low profile tire. Even in a perspective view, it would be difficult for a casual observer to detect that the barrel 70 of the wheel 60 is not commensurate in size with the outer diameter of the outboard face 64 of the wheel 60, and that the tire 90 is actually much wider than it appears from the inner radial edge of the tire wall 92 to the tread 98.

In the illustrated embodiment, there is a relatively small gap 111 between the flange seat 109 and the outer flange 66. The gap 111 permits the flange seat 109 to flex and bend a small amount under normal driving conditions. If there were a substantial gap between the outer flange 66 and the outboard tire wall 42, the effectiveness of the simulation of a large-diameter wheel would be greatly diminished because the outer flange 66 may appear to be separated from the rest of the wheel, and the underlying tire wall 42 may be visible behind the outer flange 66. Of course, the flange seat 109 could also be constructed such that there is no gap between the flange seat 109 and the outer flange to achieve a tighter fit.

The lengths of each of the outboard and inboard tire walls 92, 96 are each preferably in the range of about 3½ inches to 5½ inches. Moreover, the distance between the tread 98 and the inner diameter of the outboard tire wall 92 is preferably about the same as the distance between the tread 98 and the inner diameter of the inboard tire wall 96. If either of the tire walls 92, 96 were substantially longer than the other, the tire might be subject to unbalanced stresses or wear, and perhaps require a specialized fitting for the wheel on which the tire is mounted. Of course, the lengths of the inboard and outboard tire walls 92, 96 could be different, especially if the tire 90 were designed to be mounted on a modified wheel wherein the inboard and outboard diameters of the barrel 70 were not the same.

Figure 12:
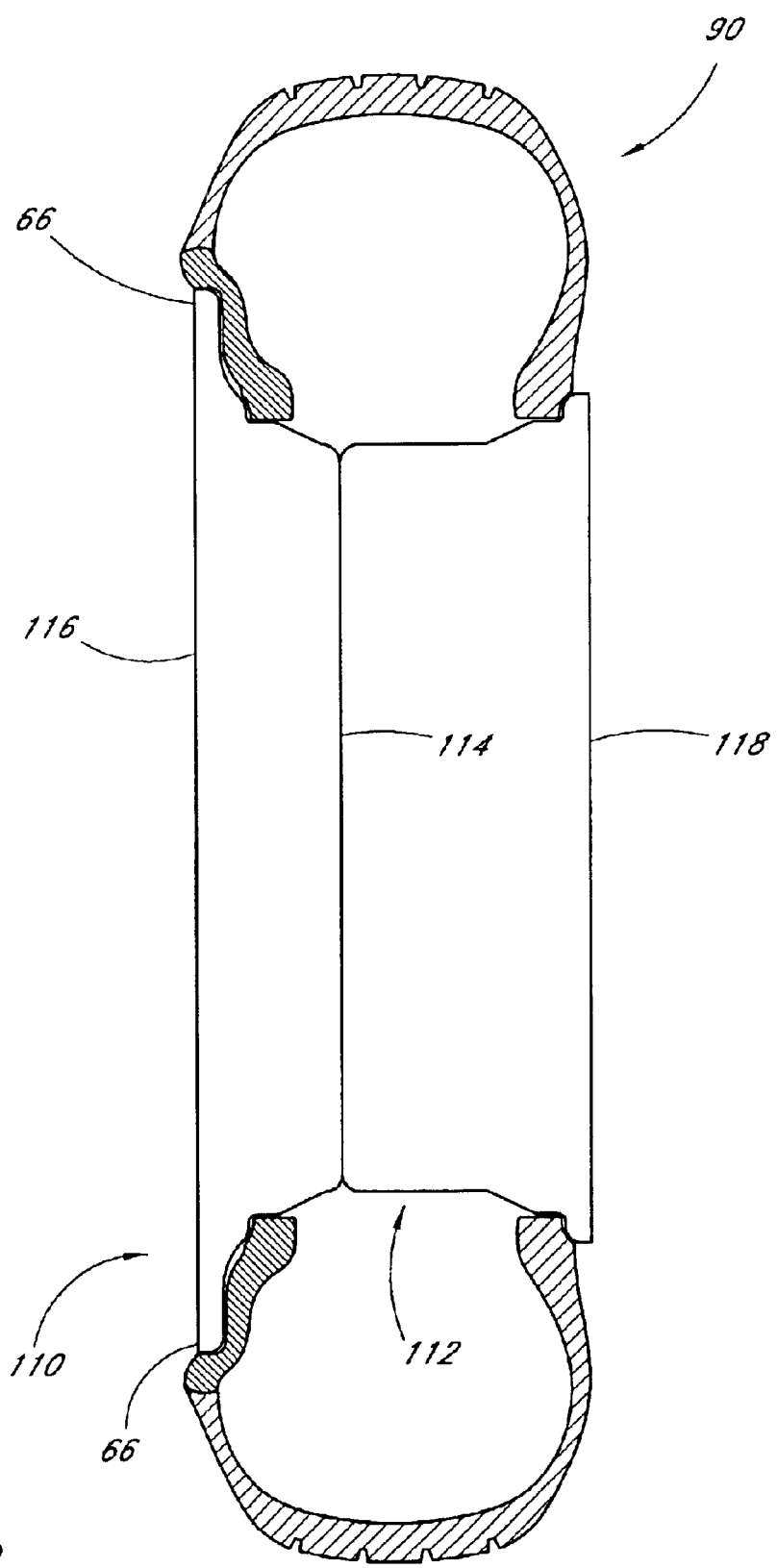
FIG. 12 is a side view of another embodiment of a wheel of the present invention with the tire of FIG. 10 mounted thereon.
Figure 13:
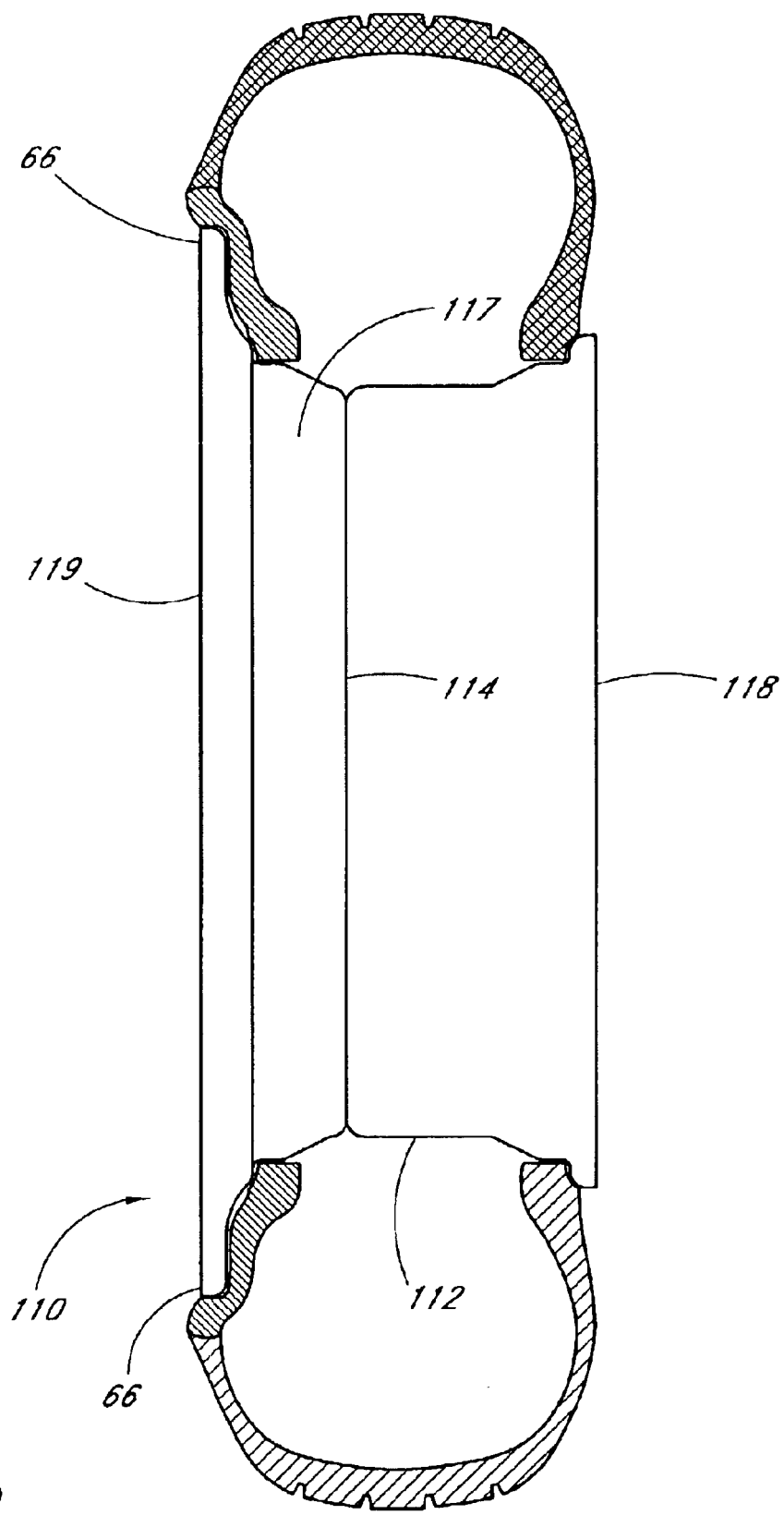
FIG. 13 is a side view of yet another embodiment of a wheel of the present invention with the tire of FIG. 10 mounted thereon.

FIG. 12 is a side view of another embodiment of a wheel 110 of the present invention with the tire 90 of FIG. 10 mounted thereon. The wheel 110 is similar to the wheel 60 of FIGS. 6, 7, 9, and 11, but the barrel 112 is divided into an outboard portion 116 and an inboard portion 118 along a vertical interface 114. In the wheel industry, a wheel with such a divided barrel is commonly referred to as a "two-piece" wheel. As shown in FIG. 13, the outboard portion may be further divided into an outboard face 119 and a middle portion 117. The wheel 110 is referred to in the wheel industry as a "three-piece" wheel. The various portion 116, 119, 117 of the wheel 110 may be detached from the inboard portion 118 of the wheel 110 by removing securing bolts (not shown).

In general, two- and three-piece wheels are more costly than one-piece wheels and are targeted at consumers who drive more expensive vehicles. Many high-end vehicles come stock from the factory with two- and three-piece wheels. The inboard portion 118 of such wheels usually has a specialized size and shape to fit a particular type of vehicle axle or to accommodate specially designed components in the braking, steering, or suspension systems. It would not be cost-effective for most after-market wheel manufacturers to make different types of one-piece wheels for each of the different types of vehicles that require specialized wheel parts. Instead, the vehicles come with a two- or three-piece wheels with a specialized inboard portion 118, but an interchangeable front face 116 and/or middle portion 117. In this way, the consumer can obtain an after-market wheel with a stylish appearance, but the wheel manufacturer does not need to undertake the expense of building and marketing different one-piece wheels for the many different varieties of specialized wheel sizes.

The individual costs of manufacturing two- and three-piece wheels may be higher, but the overall volume of such wheel sales in the industry is much lower than the sales volume for one-piece wheels. For this reason, one-piece wheels are generally made with expensive, high-volume casting equipment, whereas two- and three-piece wheels are machined from blocks of alloy metal. It is generally less expensive to re-tool the machining process to manufacture a larger wheel or a specialty wheel than it would be to re-tool the high-volume casting equipment. Thus, it is contemplated that the present invention may be especially suited for the production of machined two- and three-piece wheels sizes that may not yet even be available in one-piece molded sizes.

While the foregoing description sets forth various examples and details relating to preferred embodiments, it should be appreciated that the description is illustrative only and should not to be construed as limiting the invention. Thus, the scope of this disclosure is not to be limited by the illustrations or the foregoing descriptions thereof, but rather solely by the appended claims.

What is claimed is:

1. A wheel and tire adapted to be attached to a vehicle, comprising:
    (a) the wheel comprising:
        (i) a central hub adapted to be attached to the vehicle, the central hub having an inboard side, an outboard side, and a central axis;
        (ii) an inboard lip formed on the inboard side of the hub and extending radially outwardly;
        (iii) an outer flange formed on the outboard side of the hub and extending radially outwardly, the outer flange having an inner diameter and an outer diameter, the outer diameter being greater than an outer diameter of the inboard lip, and the outer flange having an inboard side and an outboard side;
        (iv) a design on the central hub that extends across at least a portion of the outer flange of the wheel, the distance between the central axis of the hub to the furthest radial extent of the design being greater than the distance between the central axis of the hub and the outer diameter of the inboard lip;
    (b) the tire comprising:
        (i) an inboard tire wall having an inner diameter, an outer diameter, and an inboard bead;
        (ii) an outboard tire wall having an inner diameter, an outer diameter, and a flange seat, the flange seat having an outboard bead and a ledge, the radial distance between the inner and outer diameters of the inboard tire wall being approximately equal to the radial distance between the inner and outer diameters of the outboard tire wall;
    wherein the tire is mounted on the wheel such that the inboard side of the outer flange substantially overlaps, and is in close proximity with, the flange seat, the outer radial edge of the outer flange is juxtaposed in substantially facing relationship with the tire ledge, the inboard lip interfaces with the bead of the tire, the area of interface between the outer flange of the wheel and the flange seat on the outboard tire wall is substantially greater than the area of interface between the inboard lip and the bead on the inboard tire wall, the outer flange extends radially outwardly no more than about halfway between the inner and outer diameters of the outboard tire wall and at least a portion of the outboard tire wall extends farther in the outboard direction than the outboard face of the outer flange, so as to give an appearance of a larger-diameter wheel mounted within a lower-profile tire.

2. The wheel and tire of claim 1, wherein the outer diameter of the outer flange is at least about ¼ inch greater than the outer diameter of the inboard lip.

3. The wheel and tire of claim 1, wherein the outer diameter of the outer flange is at least about ¾ inch greater than the outer diameter of the inboard lip.

4. The wheel and tire of claim 1, wherein the outer diameter of the outer flange is at least about 1¼ inch greater than the outer diameter of the inboard lip.

5. The wheel and tire of claim 1, wherein the outer diameter of the outer flange is at least about 1¾ inch greater than the outer diameter of the inboard lip.

6. The wheel and tire of claim 1, wherein the outer flange is adapted to abut against the outer wall of the tire with substantially no gap therebetween when mounted thereon after the tire is pressurized.

7. The wheel and tire of claim 1, wherein the central hub comprises a plurality of spokes and the pattern on the outer flange gives the appearance that the spokes extend across at least a portion of the outer flange.

8. The wheel and tire of claim 1, wherein the difference between the inner diameter of the outboard tire wall and the outer diameters of the outer flange is at least about 2 inches.

9. The wheel and tire of claim 1, wherein the difference between the inner diameter of the outboard tire wall and the outer diameters of the outer flange is at least about 2½ inches.

10. The wheel and tire of claim 8, wherein the outer flange is at least about twice as wide as the inboard lip.

11. The wheel and tire of claim 1, further comprising a wheel protector formed on the outboard tire wall.

12. The wheel and tire of claim 1, wherein the ledge has an inboard edge, an outboard edge, and a width therebetween, the width of the ledge being at least about ⅛ inch, and the ledge being substantially parallel with the central axis of the wheel.

13. The wheel and tire of claim 1, wherein the inboard and outboard walls of the tire are not symmetrical.

14. A wheel and tire adapted to be attached to a vehicle, comprising:
    (a) the wheel comprising:
        (i) a central hub adapted to be attached to the vehicle, the central hub having an inboard side, an outboard side, and a central axis;
        (ii) an inboard lip formed on the inboard side of the hub and extending radially outwardly;
        (iii) an outer flange formed on the outboard side of the hub and extending radially outwardly, the outer flange having an inner diameter and an outer diameter, the outer diameter being greater than an outer diameter of the inboard lip, and the outer flange having an inboard side and an outboard side;

(iv) a design on the central hub that extends across at least a portion of the outer flange of the wheel, the distance between the central axis of the hub to the furthest radial extent of the design being greater than the distance between the central axis of the hub and the outer diameter of the inboard lip; and (b) the tire comprising:

(i) an inboard tire wall having an inner diameter, an outer diameter, and a width therebetween;

(ii) an outboard tire wall having an inner diameter, and outer diameter, and a width therebetween, the widths of the inboard and outboard tire walls being approximately equal;

wherein the tire is mounted on the wheel such that an area of interface between the outer flange of the wheel and the outboard tire wall is substantially greater than an area of interface between the inboard lip and the inboard tire wall, and the outer radial edge of the outer flange is juxtaposed in substantially facing relationship with at least a portion of the outboard tire wall, the outer flange extends radially outwardly no more than about halfway between the inner and outer diameters of the outboard tire wall, and at least a portion of the outboard tire wall extends farther in the outboard direction than the outboard face of the outer flange, so as to give an appearance of a larger-diameter wheel mounted within a lower-profile tire.

15. The wheel and tire of claim 14, wherein the outer diameter of the outer flange is at least about ¼ inch greater than the outer diameter of the inboard lip.

16. The wheel and tire of claim 14, wherein the outer diameter of the outer flange is at least about 1¾ inch greater than the outer diameter of the inboard lip.

17. The wheel and tire of claim 14, wherein the outer flange is adapted to abut against the outer wall of the tire with substantially no gap therebetween when mounted thereon after the tire is pressurized.

18. The wheel and tire of claim 14, wherein the central hub comprises a plurality of spokes and the pattern on the outer flange gives the appearance that the spokes extend across at least a portion of the outer flange.

19. The wheel and tire of claim 14, wherein the difference between the inner and outer diameters of the outer flange is at least about 2 inches.

20. The wheel and tire of claim 14, wherein the outer flange is at least about twice as wide as the inboard lip.

21. The wheel and tire of claim 14, further comprising a wheel protector formed on the outboard tire wall.

* * * * *